(12) United States Patent
Tran et al.

(10) Patent No.: US 8,339,738 B1
(45) Date of Patent: Dec. 25, 2012

(54) METHOD FOR PROVIDING A MAGNETIC RECORDING TRANSDUCER HAVING A HYBRID MOMENT POLE

(75) Inventors: Ut Tran, San Jose, CA (US); Zhigang Bai, Milpitas, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/528,007

(22) Filed: Jun. 20, 2012

Related U.S. Application Data (62) Division of application No. 12/196,131, filed on Aug. 21, 2008, now Pat. No. 8,228,633.

(51) Int. Cl.
*G11B 5/127* (2006.01)
(52) U.S. Cl. .................................. 360/125.07
(58) Field of Classification Search ............. 360/125.07
See application file for complete search history.

(56) References Cited

U.S. PATENT DOCUMENTS

| | | | |
|---|---|---|---|
| 5,157,570 A | 10/1992 | Shukovsky et al. | |
| 5,452,167 A | 9/1995 | Nago | |
| 5,750,275 A | 5/1998 | Katz et al. | |
| 5,792,547 A | 8/1998 | Liu et al. | |
| 5,805,392 A | 9/1998 | Mallary et al. | |
| 6,108,167 A | 8/2000 | Tateyama et al. | |
| 6,233,116 B1 | 5/2001 | Chen et al. | |
| 6,296,955 B1 | 10/2001 | Hossain et al. | |
| 6,381,093 B2 | 4/2002 | Yoshida et al. | |
| 6,628,478 B2 | 9/2003 | Gill | |
| 6,693,769 B2 | 2/2004 | Hsu et al. | |
| 6,721,131 B2 | 4/2004 | Litvinov et al. | |
| 6,724,572 B1 | 4/2004 | Stoev et al. | |
| 6,778,358 B1 | 8/2004 | Jiang et al. | |
| 6,791,796 B2 | 9/2004 | Shukh et al. | |
| 6,795,272 B2 | 9/2004 | Kudo et al. | |
| 6,909,579 B2 | 6/2005 | Lee et al. | |
| 6,930,863 B2 | 8/2005 | Biskeborn | |
| 6,975,486 B2 | 12/2005 | Chen et al. | |
| 7,038,882 B2 | 5/2006 | Crue et al. | |
| 7,046,481 B2 | 5/2006 | Lee | |
| 7,177,117 B1 | 2/2007 | Jiang et al. | |
| 7,280,314 B2 | 10/2007 | Gill et al. | |
| 7,646,564 B2 * | 1/2010 | Maruyama et al. | 360/125.07 |
| 7,841,068 B2 * | 11/2010 | Chen et al. | 29/603.16 |
| 8,018,679 B2 * | 9/2011 | Hsiao et al. | 360/125.07 |
| 8,228,633 B1 | 7/2012 | Tran et al. | |
| 2003/0021063 A1 | 1/2003 | Kuroda et al. | |
| 2003/0193742 A1 | 10/2003 | Matono et al. | |
| 2004/0061973 A1 | 4/2004 | Crue et al. | |

(Continued)

OTHER PUBLICATIONS

Office Action dated Dec. 9, 2011 from U.S. Appl. No. 12/196,131, 13 pages.

(Continued)

*Primary Examiner* — Mark Blouin (57) ABSTRACT

A method for fabricating a magnetic transducer having an air-bearing surface (ABS) is provided. The method comprises providing an underlayer, and providing a main pole residing on the underlayer and having a front and a rear. The step of providing a main pole further includes providing a first portion having a first magnetic moment, the first portion having a front face at the ABS and terminating between the ABS and the rear of the main pole, and providing a second portion having a second magnetic moment. A part of the second portion resides on the first portion, and another part of the second portion resides between the first portion of the main pole and the rear of the main pole. The first magnetic moment is less than the second magnetic moment.

12 Claims, 11 Drawing Sheets

U.S. PATENT DOCUMENTS

2004/0066574 A1 4/2004 Crue et al.
2005/0041337 A1 2/2005 Yazawa et al.
2006/0044680 A1 3/2006 Liu et al.
2006/0092568 A1 5/2006 Chen et al.
2007/0230044 A1 10/2007 Han et al.

OTHER PUBLICATIONS

Notice of Allowance dated Mar. 29, 2012 from U.S. Appl. No. 12/196,131, 7 pages.

* cited by examiner

METHOD FOR PROVIDING A MAGNETIC RECORDING TRANSDUCER HAVING A HYBRID MOMENT POLE

CROSS REFERENCE TO RELATED APPLICATIONS

This application is a divisional of U.S. patent application Ser. No. 12/196,131, filed on Aug. 21, 2008, which is hereby incorporated by reference in its entirety.

BACKGROUND

Figure 1:
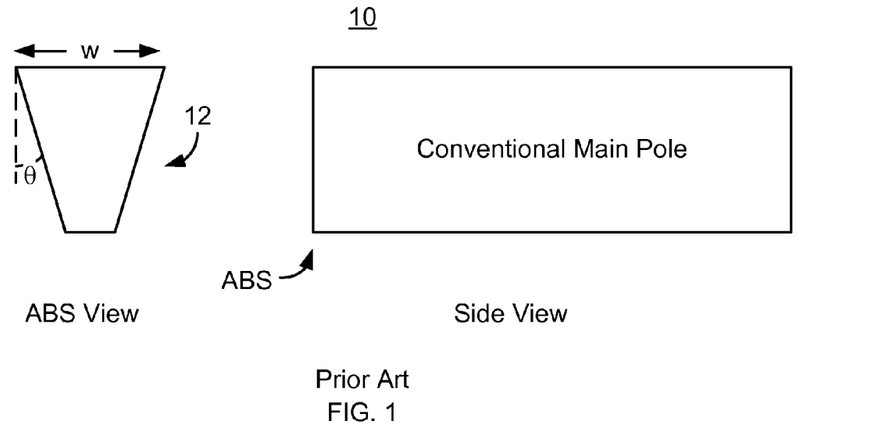
FIG. 1 depicts air-bearing surface and side views of a conventional magnetic recording head.

FIG. 1 depicts air-bearing surface (ABS) and side views of a conventional main pole 10 for a conventional magnetic recording head. The conventional magnetic recording head may be a perpendicular magnetic recording (PMR) head. The conventional magnetic recording head typically includes a conventional read transducer (not shown) and a conventional write transducer (not shown). The conventional main pole 10 includes sidewalls 12 at an angle, θ, from vertical. For the conventional main pole 10 to be used, the angle, θ, is greater than zero degrees. For example, angles in the range of eight to nine degrees may be used. The width, w, of the main pole corresponds to the track width of the conventional main pole 10. The conventional main pole 10 includes a high moment material, such as CoFe having a moment of two Tesla or higher.

Although the conventional main pole 10 functions, the trend in magnetic recording heads is to higher recording densities and, therefore, lower widths. As the width of the conventional main pole 10 is reduced, the bottom of the conventional main pole 10 will eventually reduce in size, ending in a point. Such a conventional main pole 10 may be difficult to fabricate.

Figure 2:
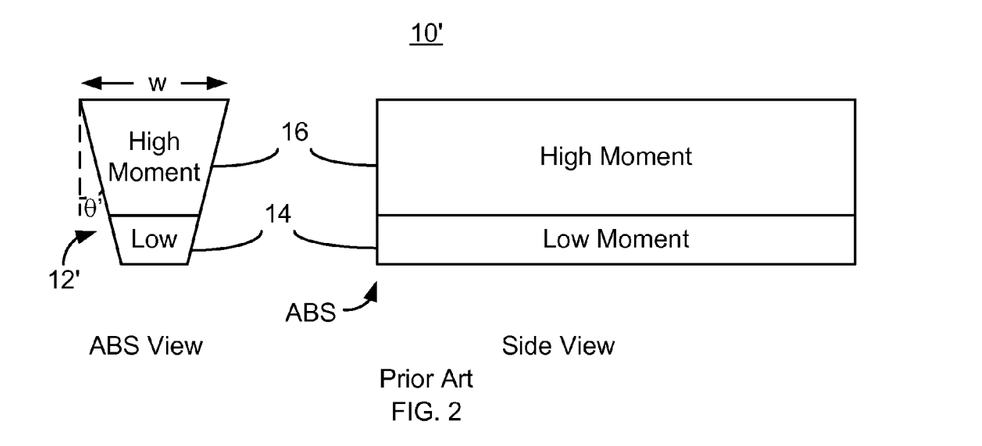
FIG. 2 depicts air-bearing surface and side views of another conventional magnetic recording head.

FIG. 2 depicts ABS and side views of another conventional main pole 10' for a conventional magnetic recording head. The conventional magnetic recording head may be a PMR head. The conventional magnetic recording head typically includes a conventional read transducer (not shown) and a conventional write transducer (not shown). The conventional main pole 10' is analogous to the conventional main pole 10' and thus includes sidewalls 12' at an angle, θ', from vertical. The conventional main pole 10' also includes a high moment portion 16 and a low moment portion 14. The high moment portion 16 is analogous to the main pole 10, and thus may have a moment of greater than two Tesla. The low moment portion 14 has a moment less than two Tesla.

Because of the inclusion of the low moment portion 14, the conventional main pole 10' may have a smaller angle, θ'. Stated differently, the conventional main pole 10' may have a smaller physical angle θ' and thus a wider bottom than the conventional main pole 10 for the same width, w. As a result, the conventional main pole 10' may be easier to fabricate than the conventional main pole 10 at lower widths, w.

Although the conventional main pole 10' may be easier to fabricate at higher recording densities, writeability may suffer. The conventional main pole 10' may be unable to deliver as high a magnetic field as desired to write to smaller tracks. Consequently, even though such a conventional pole 10' may be produced, the magnetic recording heads using such poles 10' may not function as desired.

Accordingly, what is needed is a system and method for improving the performance of a magnetic recording head at higher recording densities.

BRIEF SUMMARY OF THE INVENTION

A method and system provide a magnetic transducer that includes an air-bearing surface (ABS). The magnetic transducer includes an underlayer and a main pole residing on the underlayer. The main pole includes a front and a rear. The front resides at the ABS, while the rear is distal from the ABS. The main pole also includes a first portion having a first magnetic moment and a second portion having a second magnetic moment. The first portion has a front face at the ABS and terminates between the ABS and the rear of the main pole. A part of the second portion resides on the first portion, while another part of the second portion resides between the first portion of the main pole and the rear of the main pole. The first magnetic moment is less than the second magnetic moment.

DETAILED DESCRIPTION OF THE PREFERRED EMBODIMENTS

Figure 3:
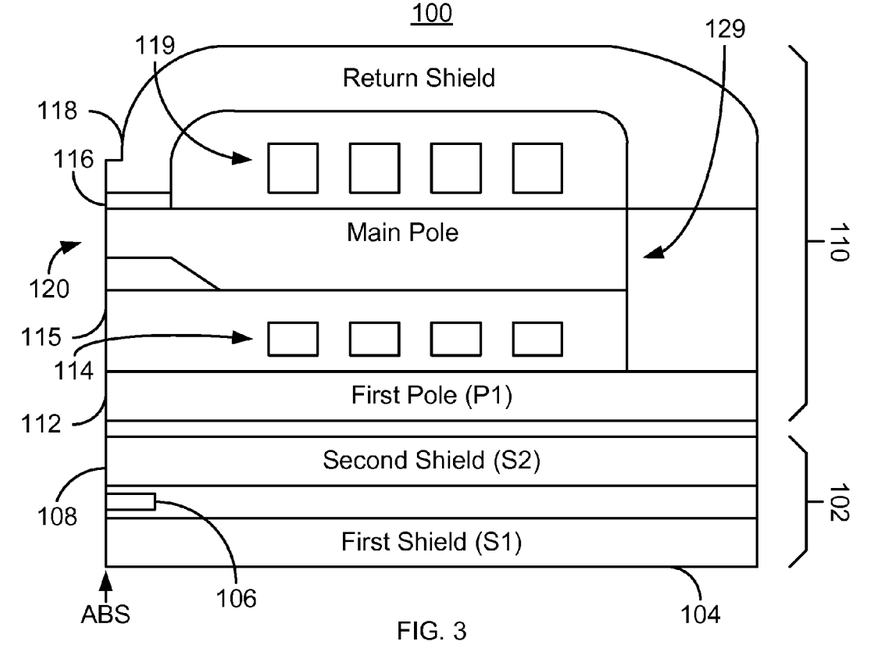
FIG. 3 depicts a side view of an exemplary embodiment of a magnetic recording head.

FIG. 3 depicts a side view of an exemplary embodiment of a magnetic recording head 100. For clarity, FIG. 3 is not drawn to scale. In addition, seed and/or capping layers are not shown. The magnetic recording head 100 may reside on a slider and be part of a disk drive. The magnetic recording head 100 shown is a merged head including a read transducer 102 and a write transducer 110. In another embodiment, the magnetic head 100 may include only the magnetic transducer 110. The read transducer 102 includes first and second shields 104 and 108 as well as a read sensor 106 between the shields 104 and 108. The magnetic transducer 110 shown is a PMR transducer and includes a first pole 112, coils 114 and 119, write gap 116, return shield 118, and main pole 120. The main pole 120 resides on an underlayer 115. In another embodiment, portions of the magnetic transducer 110 may be omitted. For example, a single coil 114 or 119 may be used. Similarly, the return shield 118 might be omitted. Features of the main pole 120 are further depicted in FIG. 4.

Figure 4:
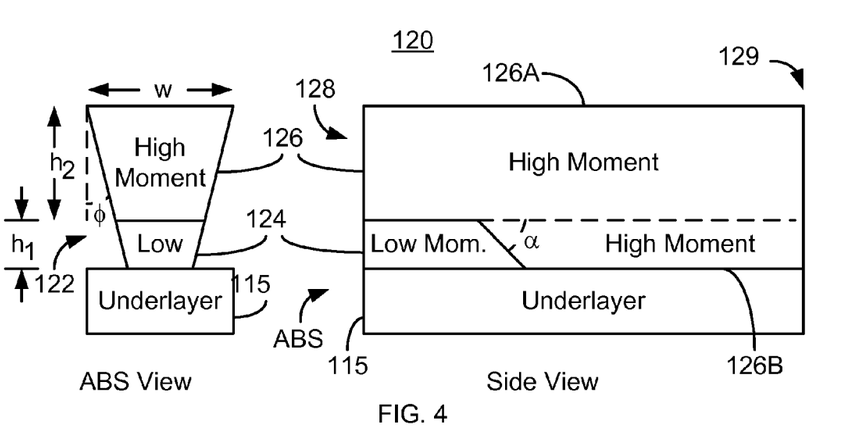
FIG. 4 depicts air-bearing surface and side views of an exemplary embodiment of a main pole.

FIG. 4 depicts air-bearing surface and side views of an exemplary embodiment of a main pole 120. For clarity, FIG. 4 is not drawn to scale. For simplicity, seed and/or capping layers are not shown. Also shown in FIG. 4 is nonmagnetic underlayer 115, which may include materials such as aluminum oxide.

The main pole 120 includes sidewalls 122, a front 128 substantially at the ABS and terminates at a rear 129 distal from the ABS. In one embodiment, the rear 129 is approximately four micrometers from the ABS. However, in other embodiments, the rear 129 of the main pole 120 may terminate a different distance from the ABS. The sidewalls 122 of the main pole 120 are undercut, making a physical angle, $\phi$, with normal to the surface. Although shown as planar surfaces, in another embodiment, the sidewalls 122 may have another shape.

The main pole also includes a first, low moment portion 124 and a second, high moment portion 126. In one embodiment, the low moment portion 124 has a height, $h_1$, that is not more than one-half of the height of the high moment portion 126, $h_2$. The moment of the low moment portion 124 is less than the moment of the high moment portion 126. In one embodiment, the high moment portion 126 has a moment greater than two Tesla. In one embodiment, both parts 126A and 126B of the high moment portion 126 have the same moment and/or may be made of the same material. For example, both parts 126A and 126B may include materials such as CoFe having a moment of 2.45 T. However, in another embodiment, the portions 126A and 126B of the high moment portion 126 may have different moments. The part 126A of the high moment portion 126 may have a higher moment and may include materials such as CoFe. The part 126B of the high moment portion 126 may have an intermediate moment above that of the low moment portion 124, but less than that of the high moment part 126A. For example, the high moment portion 126B may be laminated with layers characterized by interactions such as ferromagnetic, magnetostatic, or antiferromagnetic coupling. For example, bilayer(s) of materials such as CoFe/NiFe, CoFe/Al$_2$O$_3$, or CoFe/Ru may be used for the high moment part 126B.

In contrast, the low moment portion 124 has a moment less than the either of the parts 126A and 126B of the high moment portion 126. In one embodiment, the low moment portion 124 has a moment of at least one and not more than two Tesla. In addition to having a lower moment than the high moment portion 126, the low moment portion 124 terminates between the ABS and the rear 129 of the main pole 120. For example, in one embodiment, the low moment portion 124 terminates not more than two hundred nanometers from the ABS. In one such embodiment, the low moment portion 124 terminates at least fifty nanometers from the ABS. In another embodiment, the low moment portion 124 may terminate not less than twenty nanometers from the ABS. In the embodiment shown, the low moment portion 124 terminates at a back surface forming an angle, $\alpha$, with a line parallel to the underlayer 115. The angle, $\alpha$, my take on various values in different embodiments. In one embodiment, a may be ninety degrees. However, in other embodiments, $\alpha$ may range from at least thirty to not more than one hundred fifty degrees with the underlayer 115.

Use of the low moment portion 124 allows the physical angle, $\phi$, for the sidewalls 122 to be made smaller. For example, in one embodiment, the physical angle $\phi$ is not more than five degrees. In one such embodiment, the physical angle $\phi$ is at least two degrees. This lower physical angle $\phi$ may be achieved while maintaining the desired field contours because the field provided by the low moment portion 124 is reduced. Stated differently, a lower physical sidewall angle $\phi$ may be achieved while maintaining a higher effective "magnetic sidewall angle". As a result, the main pole 120 may be manufactured at lower track widths. In addition, because the high moment portion 126B has a higher moment, the magnitude of the field provided by the main pole 120 may be maintained at a sufficient level. Consequently, field strength may not be adversely affected. As a result, the main pole 120 may still have sufficient field strength to write to the media (not shown). Consequently, the head 100 may be fabricated and have the desired performance for higher density recording.

Figure 5:
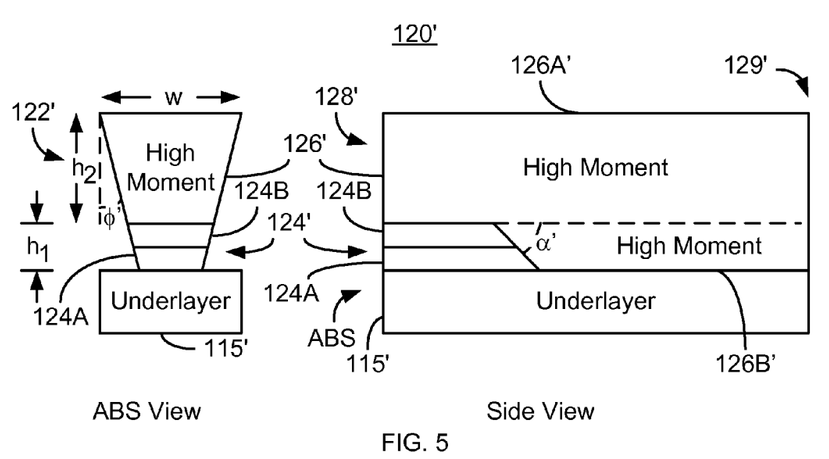
FIG. 5 depicts air-bearing surface and side views of another exemplary embodiment of a main pole.

FIG. 5 depicts air-bearing surface and side views of another exemplary embodiment of a main pole 120' that may be used in the magnetic recording transducer 110 of the head 100. For clarity, FIG. 5 is not drawn to scale. For simplicity, seed and/or capping layers are not shown. Also shown in FIG. 5 is nonmagnetic underlayer 115', which may include materials such as aluminum oxide. Portions of the main pole 120' are analogous to the main pole 120. Consequently, analogous portions of the main pole 120' are labeled similar to the main pole 120. The main pole thus includes sidewalls 122' having angles $\phi'$, front 128', rear 129', high moment portion 126' and low moment portion 124'. The high moment portion 126' is analogous to the high moment portion 126 and thus includes parts 126A' and 126B'.

In one embodiment, the low moment portion 124' has a height, $h_1$, that is not more than one-half of the height of the high moment portion 126', $h_2$. The moment of the low moment portion 124' is less than the moment of the high moment portion 126'. The high moment portion 126' has a moment greater than two Tesla. In one embodiment, both parts 126A' and 126B' of the high moment portion 126 have the same moment and/or may be made of the same material. For example, both parts 126A' and 126B' may include materials such as CoFe having a moment of 2.45 T. However, in another embodiment, the portions 126A' and 126B' of the high moment portion 126' may have different moments. The part 126A' of the high moment portion 126' may have a higher moment and may include materials such as CoFe. The part 126B' may have an intermediate moment above that of the low moment portion 124', but less than that of the high moment part 126A'. For example, the high moment part 126B' may be laminated in an analogous manner to the part 126B, discussed above.

In contrast, the low moment portion 124' has a moment less than the either of the parts 126A' and 126B' of the high moment portion 126'. In the embodiment shown, the low moment portion 124' has parts 124A and 124B. Both parts 124A and 124B have lower moment than either part 126A' and 126B' of the high moment portion 126'. In one embodiment, both parts 124A and 124B have moments of at least one and not more than two Tesla. In one embodiment, the parts 124A and 124B have different moments. The lower part 124A that is closer to the underlayer may have a moment that is less than the moment of the upper part 124B. The upper part 124B has a lower moment than either of the parts 126A' and 126B'. Further, although shown as having the same thickness, the parts 124A and 124B may have different thicknesses.

In addition to having lower moment(s) than the high moment portion 126', the low moment portion 124' terminates between the ABS and the rear 129' of the main pole 120'. For example, in one embodiment, the low moment portion 124' terminates not more than two hundred nanometers from the ABS. In one such embodiment, the low moment portion 124' terminates at least fifty nanometers from the ABS. In another embodiment, the low moment portion 124' may terminate not less than twenty nanometers from the ABS. In the embodiment shown, the low moment portion 124' terminates at a back surface forming an angle, α', with a line parallel to the underlayer 115'. The angle, α', my take on various values in different embodiments. In one embodiment, α' may be ninety degrees. However, in other embodiments, α' may range from at least thirty to not more than one hundred fifty degrees with the underlayer 115'.

Use of the low moment portion 124' allows the main pole 120' to share substantially the same benefits as the magnetic pole 120. Further, the moments of the parts 124A and 124B may be further tailored to achieve the desired performance of the magnetic head 100. Consequently, performance may be improved.

Figure 6:
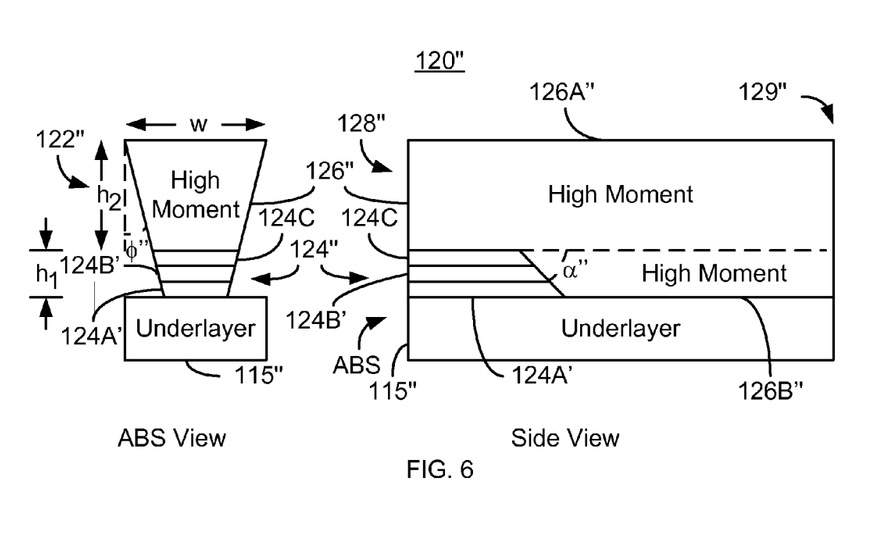
FIG. 6 depicts air-bearing surface and side views of another exemplary embodiment of a main pole.

Although only two parts 124A and 124B are shown for the low moment portion 124', more layers could be provided. For example, FIG. 6 depicts air-bearing surface and side views of another exemplary embodiment of a main pole 120" that may be used in the magnetic recording transducer 110 of the head 100. For clarity, FIG. 6 is not drawn to scale. For simplicity, seed and/or capping layers are not shown. Also shown in FIG. 6 is nonmagnetic underlayer 115", which may include materials such as aluminum oxide. Portions of the main pole 120" are analogous to the main poles 120 and 120'. Consequently, analogous portions of the main pole 120' are labeled similar to the main pole 120/120'. The main pole thus includes sidewalls 122" having angles φ", front 128", rear 129", high moment portion 126" and low moment portion 124". The high moment portion 126" is analogous to the high moment portion 126/126' and thus includes parts 126A" and 126B".

In one embodiment, the low moment portion 124" has a height, $h_1$, that is not more than one-half of the height of the high moment portion 126", $h_2$. The moment of the low moment portion 124" is less than the moment of the high moment portion 126". The moments and structures of the parts 126A" and 126B" are analogous to the parts 126A/126A' and 126B/126B'.

The low moment portion 124" is analogous to the low moment portions 124/124' and thus has a moment less than the either of the parts 126A" and 126B" of the high moment portion 126". However, the low moment portion 124" has parts 124A', 124B', and 124C'. All parts 124A', 124B' and 124C have lower moment than either part 126A" and 126B" of the high moment portion 126". In one embodiment, all parts 124A', 124B' and 124C have moments of at least one and not more than two Tesla. In one embodiment, the parts 124A', 124B', and 124C have different moments. The lower part 124A' that is closer to the underlayer may have a moment that is less than the moment of the next part 124B'. The part 124B' has a lower moment than that of the highest part 124C. The upper part 124C has a lower moment than either of the parts 126A" and 126B". Although shown as having the same thickness, the parts 124A', 124B', and 124C may have different thicknesses.

In addition to having lower moment(s) than the high moment portion 126", the low moment portion 124" terminates between the ABS and the rear 129" of the main pole 120" in a manner that is analogous to the low moment portions 124 and 124'. For example, in one embodiment, the low moment portion 124" terminates not more than two hundred nanometers and at least fifty nanometers from the ABS. In another embodiment, the low moment portion 124" may terminate not less than twenty nanometers from the ABS. In the embodiment shown, the low moment portion 124" terminates at a back surface forming an angle, α", with a line parallel to the underlayer 115". The angle, α", my take on various values in different embodiments. In one embodiment, α" may range from at least thirty to not more than one hundred fifty degrees with the underlayer 115".

Through the use of the low moment portion 124", the main pole 120" shares the benefits of the poles 120 and 120'. Consequently, performance and manufacturability may be improved.

Figure 7:
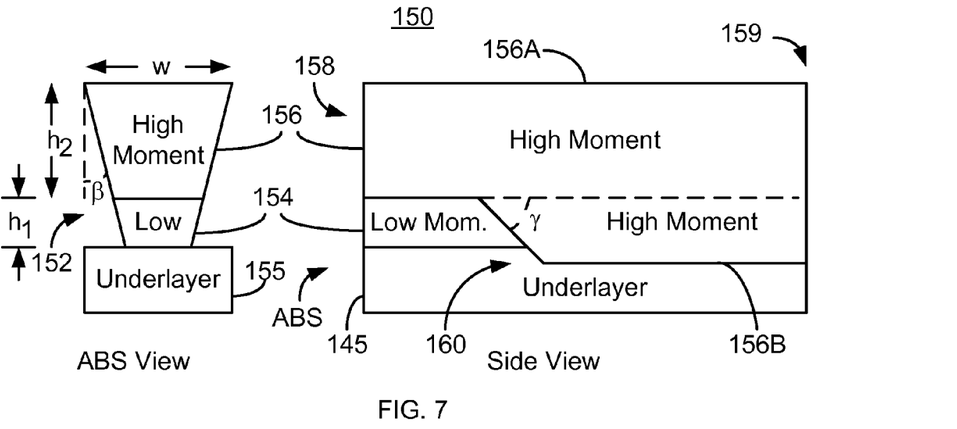
FIG. 7 depicts air-bearing surface and side views of another exemplary embodiment of a main pole.

FIG. 7 depicts air-bearing surface and side views of another exemplary embodiment of a main pole 150 that may be used in the magnetic recording transducer 110 of the head 100. For clarity, FIG. 7 is not drawn to scale and seed and/or capping layers are not shown. Also shown in FIG. 7 is nonmagnetic underlayer 145, which may include materials such as aluminum oxide and corresponds to the underlayer 115/115'/115". Portions of the main pole 150 are analogous to the main pole 120/120'/120". Consequently, analogous portions of the main pole 150 are labeled similar to the main pole 120/120'/120". These are labeled similarly. The main pole 150 thus includes sidewalls 152 having angle β, front 158, rear 159, high moment portion 156 and low moment portion 154 having angle γ that correspond to sidewalls 122/122'/122" having angle φ, front 128/128'/128", rear 129/129'/129", high moment portion 126/126'/126" and low moment portion 124/124'/124" having angle α/α'/α", respectively. Thus, the low moment portion 154 may include one or more layers of material having varying moments lower than the moment(s) of the high moment portion 156. Consequently, the main pole 150 shares substantially the same benefits as the magnetic poles 120/120'/120". Further, the main pole 150 includes a bevel 160.

Figure 8:
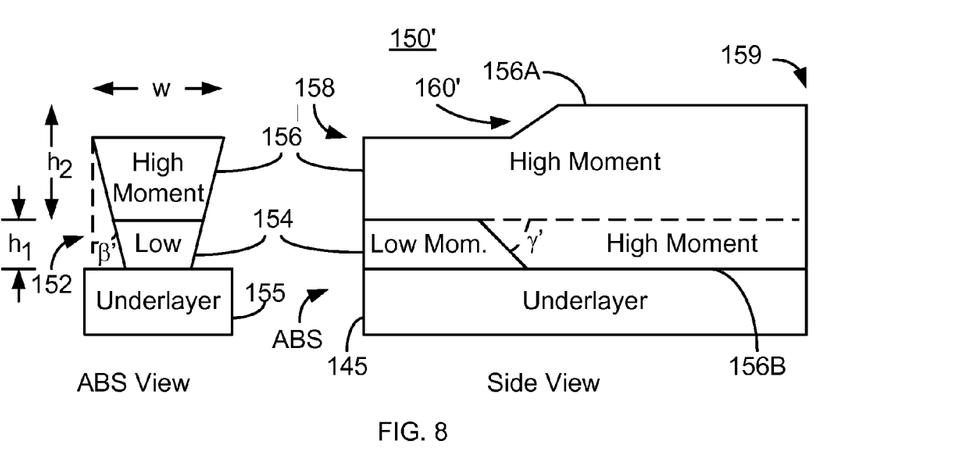
FIG. 8 depicts air-bearing surface and side views of another exemplary embodiment of a main pole.

FIG. 8 depicts air-bearing surface and side views of another exemplary embodiment of a main pole 150' that may be used in the magnetic recording transducer 110 of the head 100. For clarity, FIG. 8 is not drawn to scale and seed and/or capping layers are not shown. Also shown in FIG. 8 is nonmagnetic underlayer 145', which may include materials such as aluminum oxide and corresponds to the underlayer 115/115'/115". Portions of the main pole 150' are analogous to the main pole 120/120'/120" and 150. Consequently, analogous portions of the main pole 150' are labeled similar to the main pole 120/120'/120". These are labeled similarly. The main pole 150' thus includes sidewalls 152' having angle β', front 158', rear 159', high moment portion 156' and low moment portion 154' having angle γ' that correspond to sidewalls 122/122'/122" having angle φ/φ'/φ" front 128/128'/128", rear 129/129'/129", high moment portion 126/126'/126" and low moment portion 124/124'/124" having angle α/α'/α", respectively. Thus, the low moment portion 154' may include one or more layers of material having varying moments lower than the moment(s) of the high moment portion 156'. Consequently, the main pole 150' shares substantially the same benefits as the magnetic poles 120/120'/120" and 150. Further, the main pole 150' includes a bevel 160'. In addition, although not shown, the main pole 150' might include a bottom bevel analogous to the bevel 160. Thus, top and/or bottom levels could be provided.

Figure 9:
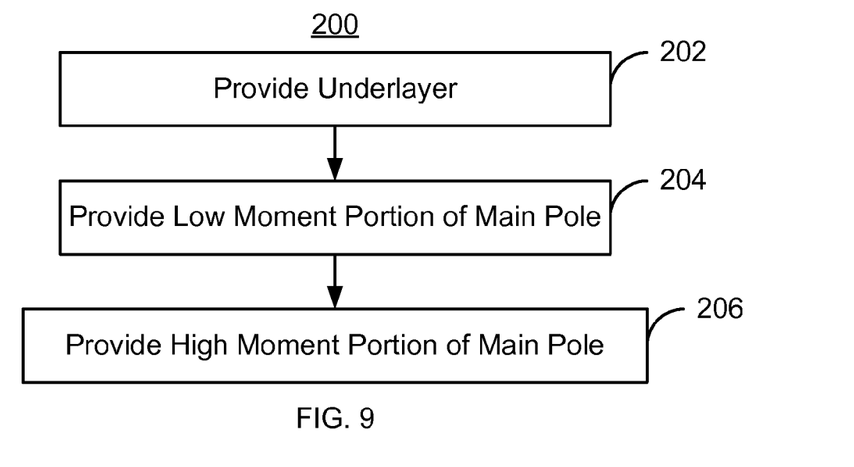
FIG. 9 is a flow chart depicting an exemplary embodiment of a method for providing a magnetic recording transducer.

FIG. 9 is a flow chart depicting an exemplary embodiment of a method 200 for providing a magnetic recording transducer. For simplicity, some steps may be omitted. The method 200 is described in the context of the magnetic transducer 100. The method 200 is also described in the context of providing a single recording transducer. However, the method 200 may be used to fabricate multiple transducers at substantially the same time. The method 200 is also described in the context of particular layers. A particular layer may include multiple materials and/or multiple sublayers. The method 200 also may start after formation of other portions of the magnetic recording transducer.

The underlayer 115 is provided, via step 202. In one embodiment, step 202 includes depositing an aluminum oxide layer. The low moment portion 124 of the main pole 120 is provided, via step 204. Step 204 may include providing seed layer(s), blanket depositing the lower moment material(s) for the portion 126, then removing a portion of the lower moment material(s) distal from the ABS. In one embodiment, step 204 may include depositing multiple layers of different magnetic moments. In such an embodiment, the main poles 120', 120", 150, and/or 150' may be provided.

The high moment portion 126 of the main pole 120 may also be provided, via step 206. Step 206 may include refilling the part 126B distal from the ABS, then depositing the part 126A. Fabrication of the main pole 120, as well as the magnetic transducer 110 and magnetic head 100 may then be completed. For example, a pole trim, write gap 116, return shield 118, lapping to the ABS, other structures and/or other processes may be provided. Thus, the main pole 120 may be provided by steps 204 and 206. Thus, using the method 200, the transducer 110, write head 100, and main pole 120/120'/120"/150/150' may be provided.

Figure 10:
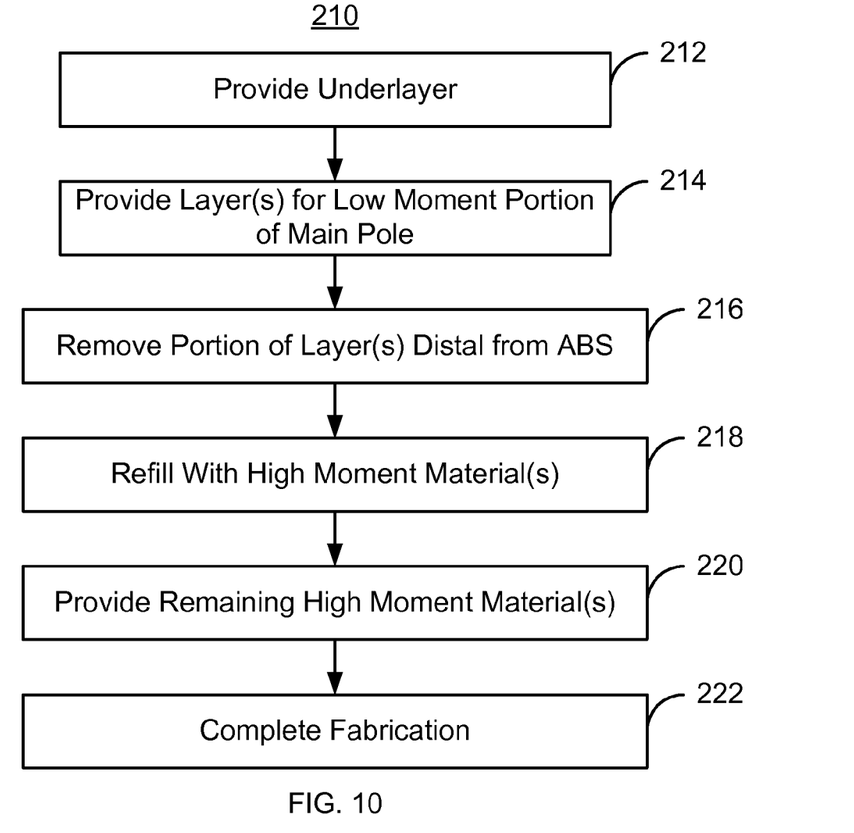
FIG. 10 is a flow chart depicting an exemplary embodiment of a method for providing a magnetic recording transducer.

FIG. 10 is a flow chart depicting an exemplary embodiment of a method 210 for providing a magnetic recording transducer. For simplicity, some steps may be omitted. FIGS. 11-15 depict an exemplary embodiment of a magnetic recording transducer during fabrication. The recording transducer is analogous to the recording transducer 110. For simplicity, only the main pole 250 and underlayer 245 of the recording transducer are shown in FIGS. 11-15. Referring to FIGS. 10-15, the method 200 is described in the context of the main pole 250. The method 210 is also described in the context of providing a single recording transducer. However, the method 210 may be used to fabricate multiple transducers at substantially the same time. The method 210 is also described in the context of particular layers. A particular layer may include multiple materials and/or multiple sublayers. The method 210 also may start after formation of other portions of the magnetic recording transducer. For simplicity, only the underlayer 245 and main pole 250 are shown. Further, any seed and capping layers are omitted. In addition, note that FIGS. 11-15 are not drawn to scale.

Figure 11:
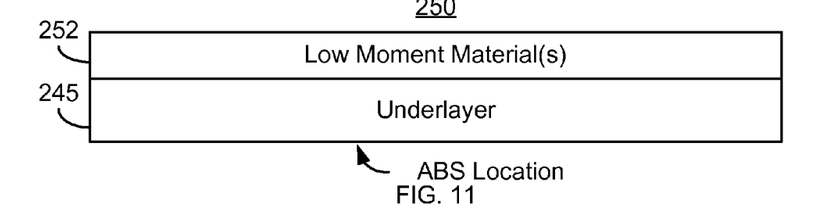
FIGS. 11-15 depict an exemplary embodiment of a magnetic recording transducer during fabrication.

The underlayer 245 is provided, via step 212. In one embodiment, step 212 includes depositing an aluminum oxide layer. The materials for low moment portion of the main pole 250 are provided, via step 214. Step 214 may include providing seed layer(s) and blanket depositing the lower moment material(s). These lower moment materials may have a moment of at least one and not more than two Tesla. In one embodiment, step 214 may include depositing multiple layers of different magnetic moments. In such an embodiment, the main pole 250 is analogous to the main poles 120', 120", 150, and/or 150'. FIG. 11 depicts the main pole 250 after step 214 is performed. Thus, low moment material(s) 252 are shown on the underlayer 245.

Figure 12:
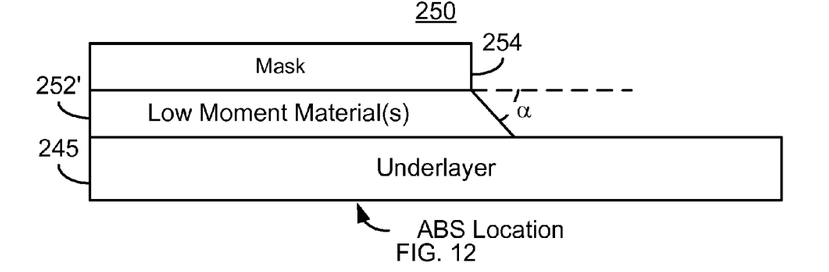

A portion of the low moment material(s) 252 distal from where the ABS will be formed is removed, via step 216. Step 216 may include forming a mask covering a portion of the low moment material(s) 252, then milling the low moment materials(s). FIG. 12 depicts the main pole 250 after step 216 is performed. Thus, a mask 254 and remaining portion of the low moment material(s) 252' are shown. The back of the low moment material(s) 252' form an angle, α, with the surface of the layers 245 and 252'.

Figure 13:
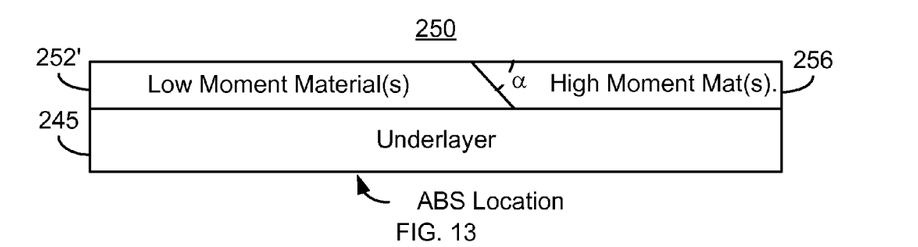

The main pole 250 is refilled with high moment material(s), via step 218. Step 218 may include depositing an alloy or forming a multilayer. The materials provided in step 218 have a moment of at least two Tesla. In one embodiment, step 218 includes removing the mask 254 after deposition of the high moment material(s). FIG. 13 depicts the main pole 250 after step 218. Thus, the high moment material(s) 256 are shown.

Figure 14:
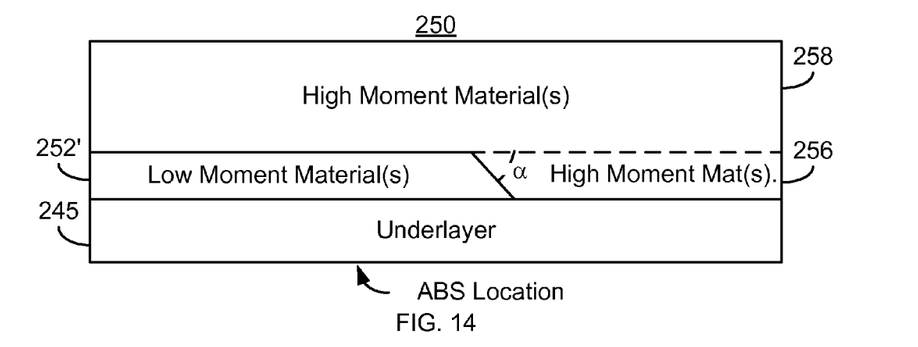

Additional high moment material(s) are also provided, via step 220. In one embodiment, in which the same materials are provided, step 220 and 218 may be merged. FIG. 14 depicts the main pole 250 after step 220 is performed. Thus, high moment material(s) 258 are shown.

Figure 15:
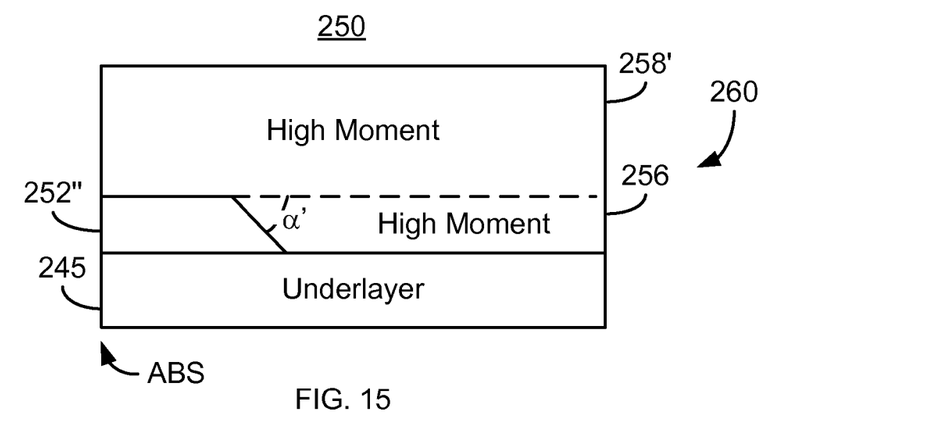

Fabrication of the main pole 250, as well as the magnetic transducer 110 and magnetic head 100 may then be completed, via step 222. For example, a pole trim, write gap, return shield, lapping to the ABS, other structures and/or other processes may be provided. FIG. 15 depicts the main pole 250 after step 222 is performed. Thus, the main pole 250 has been lapped to the ABS. As a result, the low moment portion 252" remains. The parts 256 and 258' form a high moment portion 260 analogous to the portions 126, 126', 126", 156, and 156'. Thus, using the method 210, the transducer 110, write head 100, and main pole 250 that is analogous to poles 120/120'/120"/150/150' may be provided.

Figure 16:
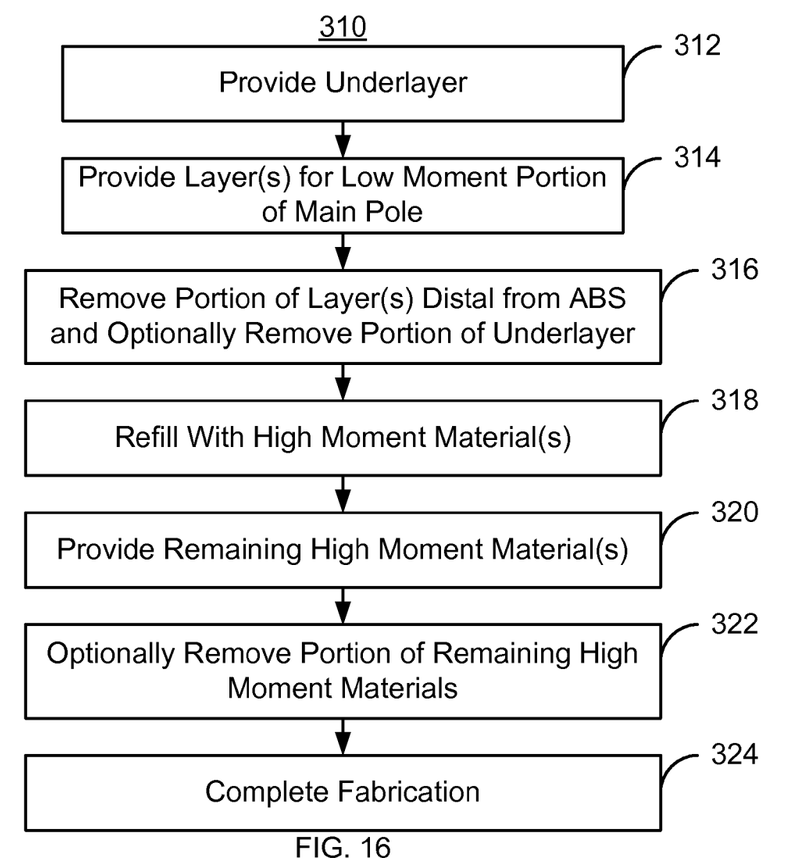
FIG. 16 is a flow chart depicting an exemplary embodiment of a method for providing a magnetic recording transducer.

FIG. 16 is a flow chart depicting an exemplary embodiment of a method 310 for providing a magnetic recording transducer including a main pole such as the main pole 150. For simplicity, some steps may be omitted. FIGS. 17-23 depict exemplary embodiments of a magnetic recording transducer during fabrication. The recording transducer is analogous to the recording transducer 110. Referring to FIGS. 16-23, the method 310 is described in the context of the main pole 350. The method 310 is also described in the context of providing a single recording transducer. However, the method 310 may be used to fabricate multiple transducers at substantially the same time. The method 310 is also described in the context of particular layers. A particular layer may include multiple materials and/or multiple sublayers. The method 310 also may start after formation of other portions of the magnetic recording transducer. For simplicity, only the underlayer 345 and main pole 350 are shown. Further, any seed and capping layers are omitted. In addition, note that FIGS. 17-23 are not drawn to scale.

The underlayer is provided, via step 312. In one embodiment, step 312 includes depositing an aluminum oxide layer. The materials for low moment portion of the main pole 350 are provided, via step 314. Step 314 may include providing seed layer(s) and blanket depositing the lower moment material(s). These lower moment materials may have a moment of at least one and not more than two Tesla. In one embodiment, step 314 may include depositing multiple layers of different magnetic moments. In such an embodiment, the main pole 350 is analogous to the main poles 120', 120", 150, and/or 150'. Because the main pole 350 would appear analogous to the main pole 250 after step 312, the main pole 350 is not shown.

Figure 17:
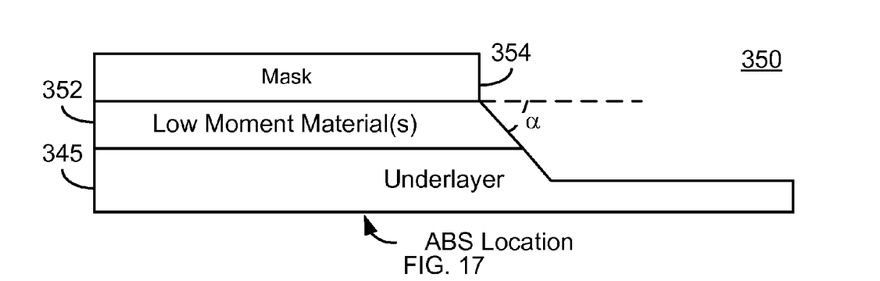
FIGS. 17-23 depict exemplary embodiments of a magnetic recording transducer during fabrication.

A portion of the low moment material(s) distal from where the ABS will be formed is removed, via step 316. Step 316 may include forming a mask covering a portion of the low moment material(s), then milling the low moment material(s). In addition, a portion of the underlayer distal from the ABS may optionally be removed in step 316. If a portion of the underlayer is removed, then a bottom bevel is provided for the main pole 350. FIG. 17 depicts the main pole 350 after step 316 is performed. In the embodiment shown, a portion of the underlayer has been removed. Thus, remaining portion of the underlayer 345 is shown. Also shown is a remaining portion of the low moment materials 352 and mask 354. The back of the low moment material(s) 352 form an angle, α, with the surface of the layers 345 and 352.

Figure 18:
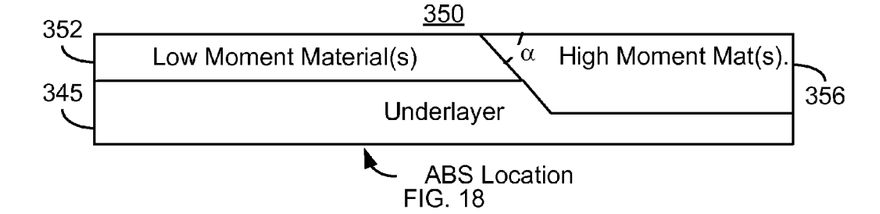

The main pole 350 is refilled with high moment material(s), via step 318. Step 318 may include depositing an alloy or forming a multilayer. The materials provided in step 318 have a moment of at least two Tesla. In one embodiment, step 318 includes removing the mask 354 after deposition of the high moment material(s). FIG. 18 depicts the main pole 350 after step 318. Thus, the high moment material(s) 356 are shown.

Figure 19:
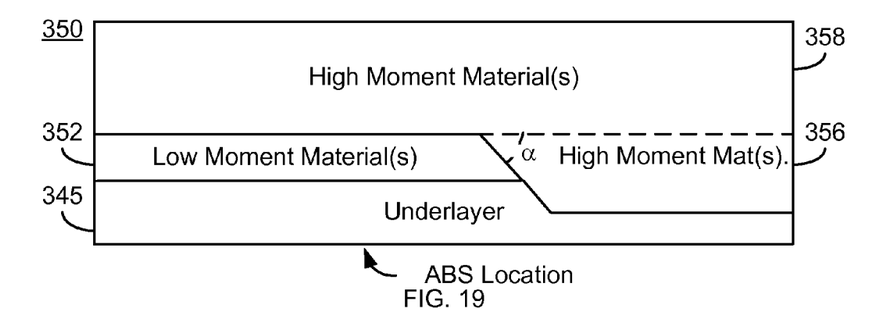

Additional high moment material(s) are also provided, via step 320. In one embodiment, in which the same materials are provided, step 320 and 318 may be merged. FIG. 19 depicts the main pole 350 after step 320 is performed. Thus, high moment material(s) 358 are shown.

Figure 20:
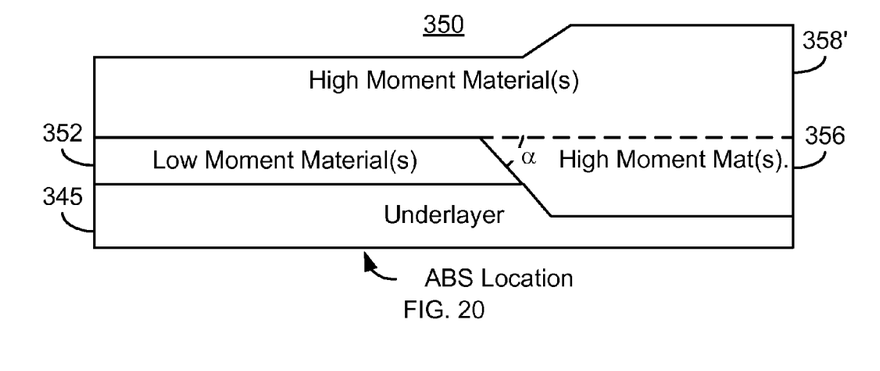

A portion of the high moment materials 358 adjacent to the ABS location optionally may be removed, via step 322. In such an embodiment, a top bevel is provided for the main pole 350. FIG. 20 depicts the main pole 350 in an embodiment in which step 322 is carried out. Thus, a remaining portion of the high moment materials 358' is shown.

Figure 21:
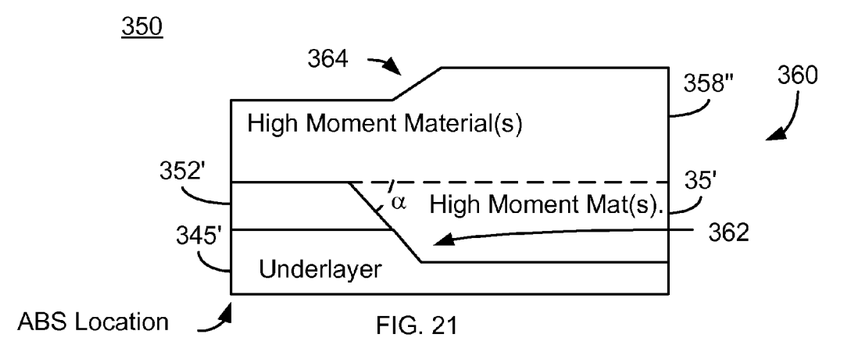
Figure 22:
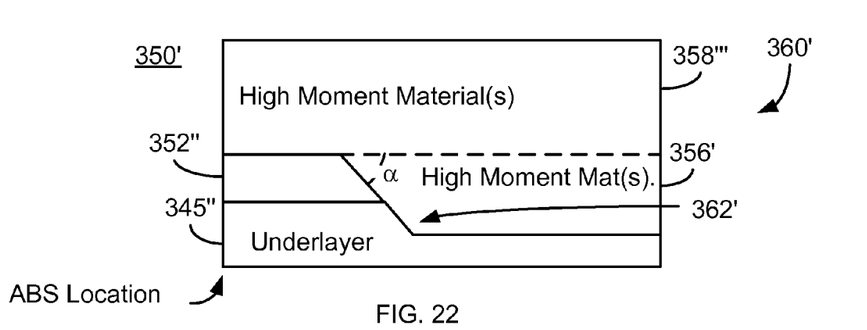
Figure 23:
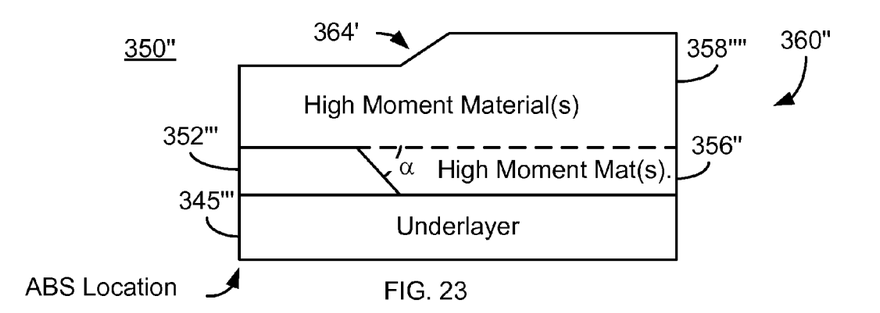

Fabrication of the main pole 350, as well as the magnetic transducer 110 and magnetic head 100 may then be completed, via step 324. For example, a pole trim, write gap, return shield, lapping to the ABS, other structures and/or other processes may be provided. FIGS. 21-23 depict various embodiments of the main pole 350, 350' and 350" after step 324 is performed. Thus, the main pole 350/350'/350" has been lapped to the ABS. As a result, the low moment portion 352'/352"/352" remains. The parts 356/3567356" and 358"/358'"/358'" form a high moment portion 360/360'/360" analogous to the portions 126, 126', 126", 156, and 156'. In the magnetic pole 350, portions of the underlayer and the high moment material(s) 358 have been removed in step 316 and 322. Thus bottom bevel 362 and top bevel 364 have been provided. In the magnetic pole 350', only a portion of the underlayer has been removed in step 316. Step 322 was, therefore, omitted. Thus, only a bottom bevel 362' is shown. In the magnetic pole 350", only a portion of the high moment material(s) 358 was removed in step 322. Thus, the portion of step 316 that would remove part of the underlayer was omitted. Consequently, only top bevel 364' is provided. Thus, using the method 310, the transducer 110, write head 100, and main poles 350/350'/350" that are analogous to poles 120/120'/120"/150/150'/250 may be provided.

Figure 24:
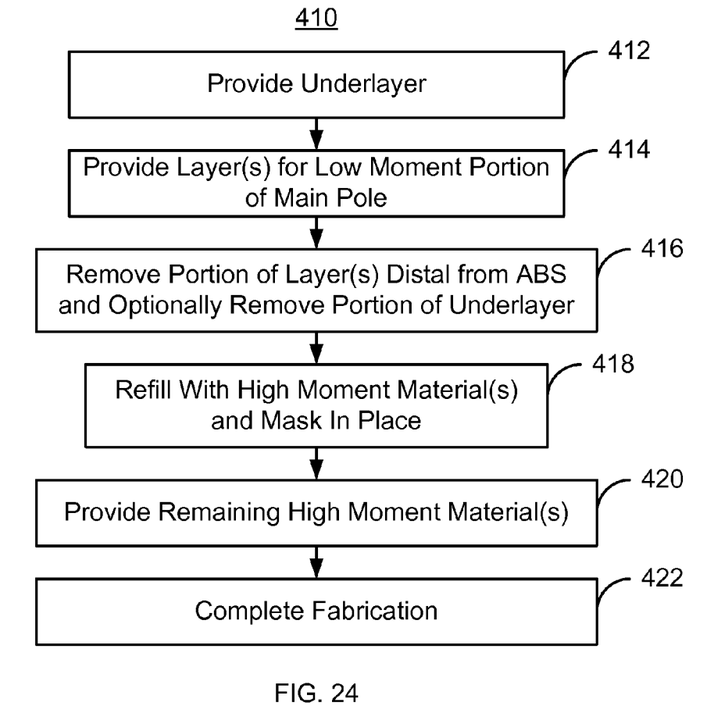
FIG. 24 is a flow chart depicting an exemplary embodiment of a method for providing a magnetic recording transducer.

FIG. 24 is a flow chart depicting an exemplary embodiment of a method 410 for providing a magnetic recording transducer including a main pole such as the main pole 150. The method 410 provides a transducer having dual bevels. For simplicity, some steps may be omitted. FIGS. 25-29 depict exemplary embodiments of a magnetic recording transducer during fabrication. The recording transducer is analogous to the recording transducer 110. Referring to FIGS. 24-29, the method 410 is described in the context of the main pole 450. The method 410 is also described in the context of providing a single recording transducer. However, the method 410 may be used to fabricate multiple transducers at substantially the same time. The method 410 is also described in the context of particular layers. A particular layer may include multiple materials and/or multiple sublayers. The method 410 also may start after formation of other portions of the magnetic recording transducer. For simplicity, only the main pole 450 and underlayer 445 of the recording transducer are shown in FIGS. 25-29. Further, any seed and capping layers are omitted. In addition, note that FIGS. 25-29 are not drawn to scale.

Figure 25:
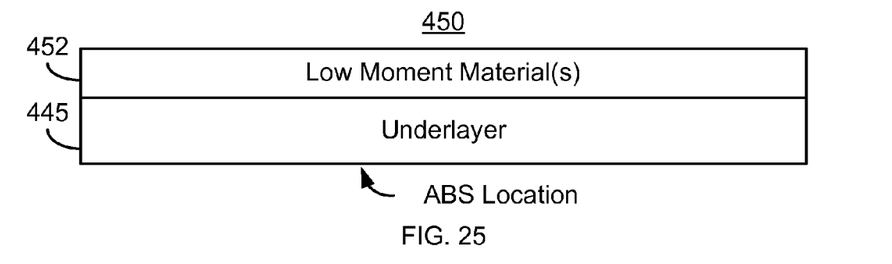
FIGS. 25-29 depict exemplary embodiments of a magnetic recording transducer during fabrication.

The underlayer 445 is provided, via step 412. In one embodiment, step 412 includes depositing an aluminum oxide layer. The materials for low moment portion of the main pole 450 are provided, via step 414. Step 414 may include providing seed layer(s) and blanket depositing the lower moment material(s). These lower moment materials may have a moment of at least one and not more than two Tesla. In one embodiment, step 414 may include depositing multiple layers of different magnetic moments. In such an embodiment, the main pole 450 is analogous to the main poles 120', 120", 150, and/or 150'. FIG. 25 depicts the main pole 450 after step 412. Thus, the underlayer 445 and low moment material(s) 452 are shown.

Figure 26:
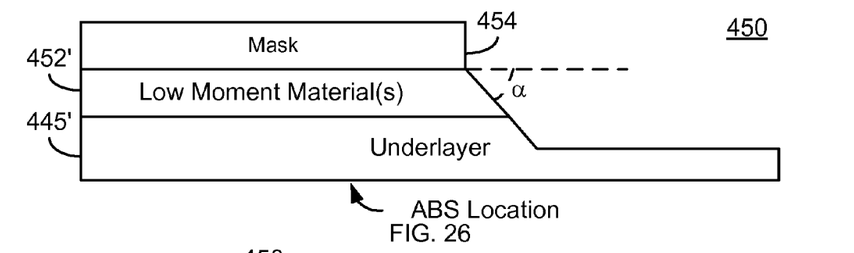

A portion of the low moment material(s) 452 and the underlayer 445 distal from where the ABS will be formed is removed, via step 416. Step 416 may include forming a mask covering a portion of the low moment material(s), then milling the low moment material(s) 452 and a portion of the underlayer 445 distal from the ABS. FIG. 26 depicts the main pole 450 after step 416 is performed. In the embodiment shown, a portion of the underlayer has been removed. Thus, remaining portion of the underlayer 445' is shown. Also shown is a remaining portion of the low moment materials 452' and mask 454. The back of the low moment material(s) 452' form an angle, α, with horizontal.

Figure 27:
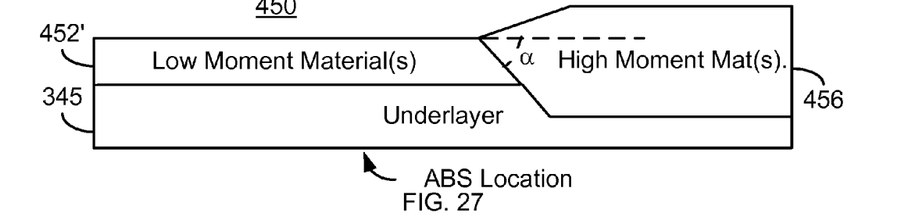

The main pole 450 is refilled with high moment material(s) while the mask 454 is in place, via step 418. Step 418 may include depositing an alloy or forming a multilayer. The materials provided in step 418 have a moment of at least two Tesla. Step 418 includes removing the mask 454 after deposition of the high moment material(s). FIG. 27 depicts the main pole 450 after step 418. Thus, the high moment material(s) 456 are shown. Because of the way in which the high moment material(s) are deposited, a portion of the high moment material(s) 456 reside above the low moment material(s) 452'.

Figure 28:
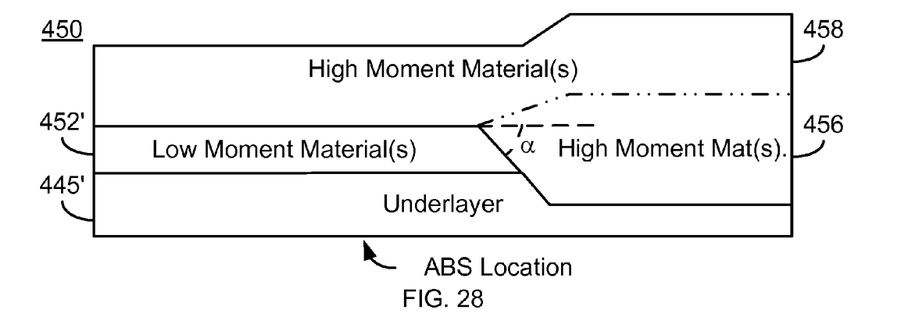

Additional high moment material(s) are also provided, via step 420. In one embodiment, the same materials may be provided. FIG. 28 depicts the main pole 450 after step 420 is performed. Thus, high moment material(s) 458 are shown.

Figure 29:
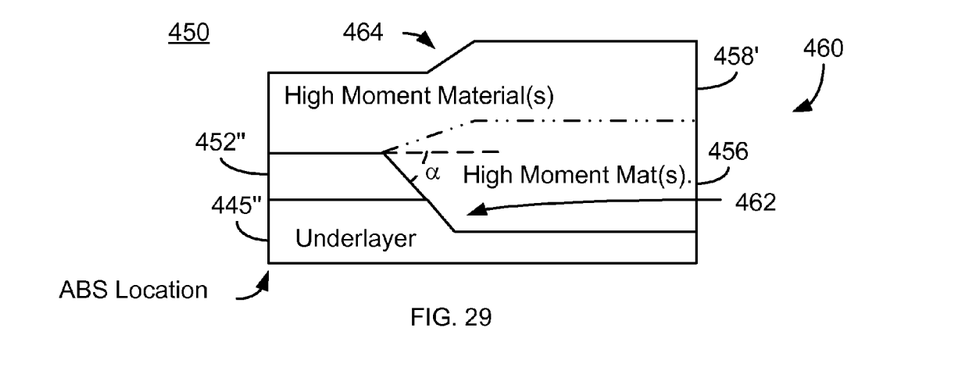

Fabrication of the main pole 450, as well as the magnetic transducer 110 and magnetic head 100 may then be completed, via step 422. For example, a pole trim, write gap, return shield, lapping to the ABS, other structures and/or other processes may be provided. FIG. 29 depicts the main pole 450 after step 422 is performed. Thus, the main pole 450 has been lapped to the ABS. As a result, the low moment portion 452" remains. The parts 456 and 458' form a high moment portion 460 analogous to the portions 126, 126', 126", 156, 156', 360. 360', and 360". Because of the removal of a portion of the underlayer 445' and because of the manner in which the high moment material(s) 456 are deposited, the main pole 450 includes bottom bevel 462 and top bevel 464. Thus, using the method 410, the transducer 110, write head 100, and main pole 450 that is analogous to poles 120/120'/120"/150/150'/250/350/350'/350" may be provided. Consequently, the benefits of the poles 120/120'/120"/150/150'/250/350/350'/350" may be achieved.

We claim:

1. A method for fabricating a magnetic transducer having an air-bearing surface (ABS) comprising:

providing an underlayer;

providing a main pole residing on the underlayer and having a front and a rear, the step of providing a main pole further including providing a first portion having a first magnetic moment, the first portion having a front face at the ABS and terminating between the ABS and the rear of the main pole;

providing a second portion having a second magnetic moment, a part of the second portion residing on the first portion, another part of the second portion residing between the first portion of the main pole and the rear of the main pole, the first magnetic moment being less than the second magnetic moment.

2. The method of claim 1 wherein the step of providing the first portion further includes:

depositing a first layer; and removing a part of the first layer distal from the ABS, a remaining portion of the first layer including the first portion.

3. The method of claim 2 wherein the step of providing the second portion further includes:

depositing a second layer of material corresponding to the another part of the second portion.

4. The method of claim 3 further comprising:

depositing the part of the second portion of the main pole.

5. The method of claim 2 further comprising:

removing a portion of the underlayer to provide a trench therein, the first portion of the main pole residing between the trench and the ABS.

6. The method of claim 5 wherein the step of providing the second portion further includes:

depositing a second layer of material corresponding to the another part of the second portion.

7. The method of claim 6 wherein the step of providing the second portion further includes:

depositing an additional layer corresponding to the part of the second portion of the main pole.

8. The method of claim 1 wherein the main pole further includes:

providing at least a third portion residing on the first portion and below the part of the second portion, the third portion having at least a third magnetic moment not more than the second magnetic moment, the at least the third portion having a front at the ABS and terminating between the ABS and the rear of the main pole.

9. The method of claim 8 wherein the at least the third magnetic moment is less than the second magnetic moment and greater than the first magnetic moment.

10. The method of claim 8 wherein the step of providing the at least the third portion further includes:

providing a plurality of layers, each of the plurality of layers having a magnetic moment greater than the magnetic moment of a lower layer.

11. The method of claim 10 wherein the main pole has a thickness, the first portion and the at least the third portion together having low moment thickness of not more than one-third of the thickness.

12. The method of claim 1 wherein the providing the second portion of the main pole further includes:

removing a portion of the part of the second portion of the main pole proximate to the ABS, thereby forming a top bevel for the second portion of the main pole.

* * * * *